United States Patent
Allen

(10) Patent No.: US 9,255,828 B2
(45) Date of Patent: Feb. 9, 2016

(54) TRANSDUCER CABLE ASSEMBLY AND FLOW METER EMPLOYING SAME

(71) Applicant: Daniel Measurement and Control, Inc., Houston, TX (US)

(72) Inventor: Charles Robert Allen, Houston, TX (US)

(73) Assignee: DANIEL MEASUREMENT AND CONTROL, INC., Houston, TX (US)

( * ) Notice: Subject to any disclaimer, the term of this patent is extended or adjusted under 35 U.S.C. 154(b) by 302 days.

(21) Appl. No.: 14/036,079

(22) Filed: Sep. 25, 2013

(65) Prior Publication Data

US 2015/0082880 A1    Mar. 26, 2015

(51) Int. Cl.
*G01F 1/58* (2006.01)
*H01R 13/62* (2006.01)
(Continued)

(52) U.S. Cl.
CPC ............... *G01F 15/14* (2013.01); *G01F 1/662* (2013.01); *G01F 15/00* (2013.01); *H01R 13/56* (2013.01); *G01F 1/684* (2013.01); *G01F 1/8409* (2013.01); *G01F 15/006* (2013.01); *G01F 15/18* (2013.01); *G01F 15/185* (2013.01); *H01R 13/115* (2013.01); *H01R 13/20* (2013.01); *H01R 13/4364* (2013.01); *H01R 13/502* (2013.01); *H01R 13/506* (2013.01); *H01R 13/58* (2013.01); *H01R 13/5812* (2013.01); *H01R 13/5841* (2013.01); *H01R 13/595* (2013.01); *H01R 31/06* (2013.01); *H01R 35/02* (2013.01)

(58) Field of Classification Search
CPC ....... G01F 1/662; G01F 1/684; G01F 1/8409; G01F 15/00; G01F 15/006; G01F 15/14; G01F 15/18; G01F 15/185; H01R 13/115; H01R 13/20; H01R 13/4364; H01R 13/502; H01R 13/506; H01R 13/56; H01R 13/58; H01R 13/5812; H01R 13/5841; H01R 13/595; H01R 31/06; H01R 35/02; H01R 4/5041
USPC .......... 73/273, 204.22, 861.12; 439/370, 153, 439/218, 350, 357, 471
See application file for complete search history.

(56) References Cited

U.S. PATENT DOCUMENTS 6,895,825 B1    5/2005 Barkhoudarian
7,326,091 B2 *  2/2008 Nania et al. ........ H01R 13/6599
                                                      439/681

(Continued)

FOREIGN PATENT DOCUMENTS

WO    2008/157114 A2    12/2008
WO    2011/085050 A2    7/2011

OTHER PUBLICATIONS

PCT/US2014/038970 International Search Report and Written Opinion dated Sep. 22, 2014 (10 p.).

*Primary Examiner* — Lisa Caputo
*Assistant Examiner* — Jonathan Dunlap
(74) *Attorney, Agent, or Firm* — Conley Rose, P.C.

(57) ABSTRACT

A cable assembly for coupling a transducer includes a plug body having a nose section with a nose end, a tail section with a tail end opposite the nose end; and a cable restraining feature disposed proximal the tail end. In addition, the cable assembly includes a cable having a first end, a second end, a signal conductor, and a pliable fixing member. A portion of the pliable fixing member is disposed in the cable restraining feature and extends at least partially around the plug body to limit the movement of the first end of the cable relative to the plug body.

22 Claims, 5 Drawing Sheets

(51) Int. Cl.
  H01R 13/58   (2006.01)
  G01F 15/14   (2006.01)
  G01F 1/66    (2006.01)
  H01R 13/56   (2006.01)
  H01R 13/502      (2006.01)
  G01F 1/84        (2006.01)
  H01R 13/506      (2006.01)
  H01R 13/436      (2006.01)
  H01R 13/20       (2006.01)
  G01F 15/00       (2006.01)
  G01F 15/18       (2006.01)
  H01R 31/06       (2006.01)
  H01R 13/115      (2006.01)
  H01R 13/595      (2006.01)
  G01F 1/684       (2006.01)
  H01R 35/02       (2006.01)

(56) References Cited

U.S. PATENT DOCUMENTS

| | | |
|---|---|---|
| 7,397,168 B2 | 7/2008 | Straub, Jr. et al. |
| 7,661,995 B2 * | 2/2010 | Nania et al. ........ H01R 13/6599 439/681 |
| 7,911,306 B2 | 3/2011 | Allen |
| 7,938,670 B2 * | 5/2011 | Nania et al. ........ H01R 13/6599 439/354 |
| 8,132,469 B2 * | 3/2012 | Allen ...................... G01F 1/662 73/861.18 |
| 8,181,533 B2 * | 5/2012 | Allen ...................... G01F 1/667 73/861.18 |
| 2004/0157499 A1 * | 8/2004 | Nania et al. ........ H01R 13/6599 439/680 |
| 2008/0166906 A1 * | 7/2008 | Nania et al. ........ H01R 13/6599 439/345 |
| 2010/0144183 A1 * | 6/2010 | Nania et al. ........ H01R 13/6599 439/248 |
| 2011/0162460 A1 * | 7/2011 | Allen ...................... G01F 1/667 73/861.18 |
| 2011/0162461 A1 * | 7/2011 | Allen ...................... G01F 1/662 73/861.18 |
| 2011/0162462 A1 * | 7/2011 | Allen ...................... G01F 1/662 73/861.18 |
| 2014/0083181 A1 * | 3/2014 | McDonald ............ G01D 11/30 73/273 |

* cited by examiner

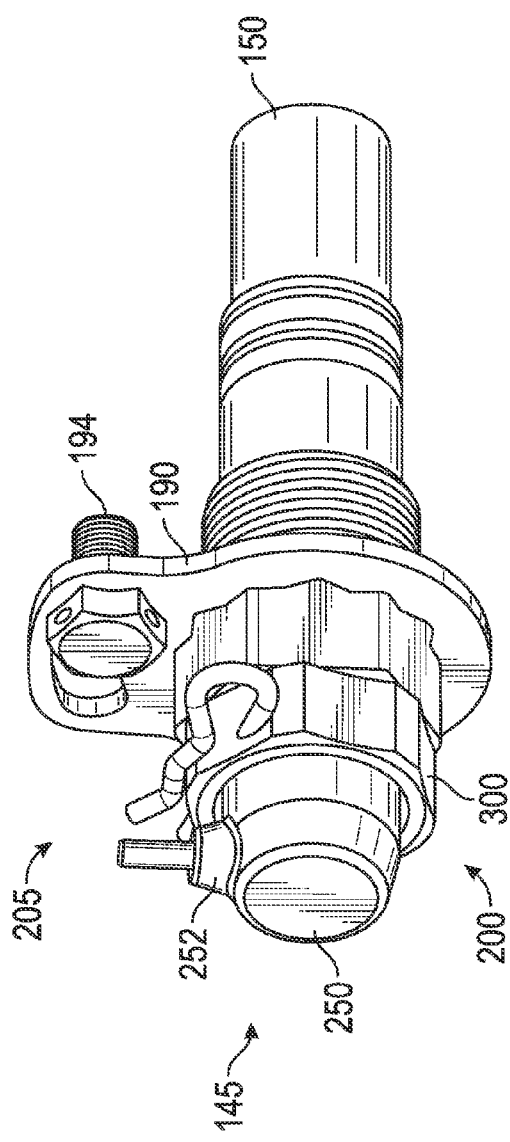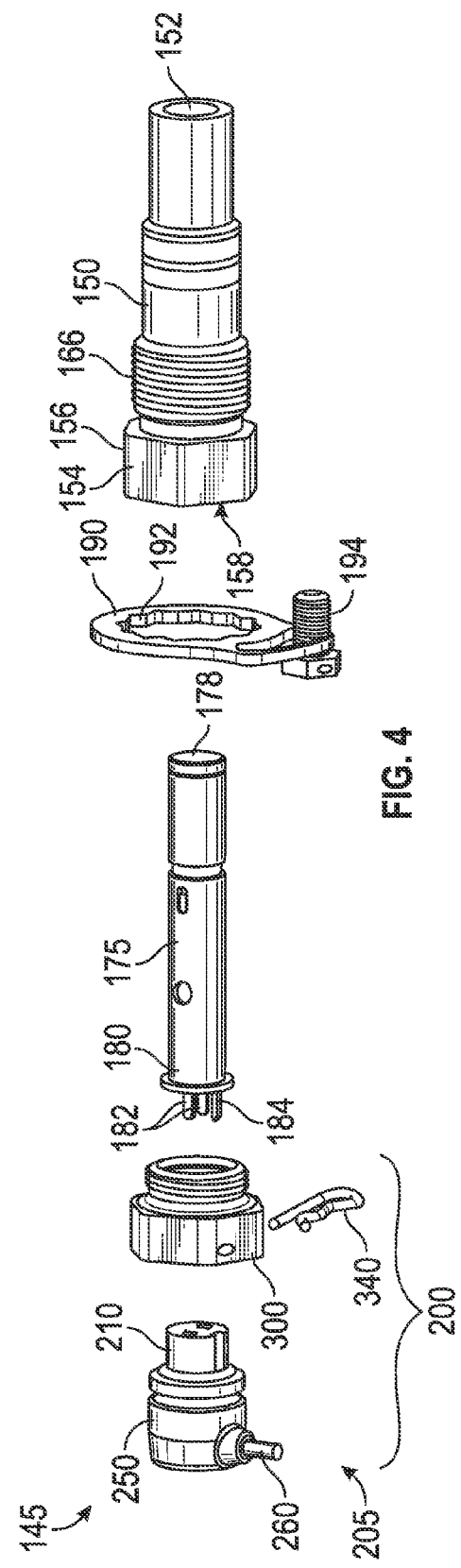

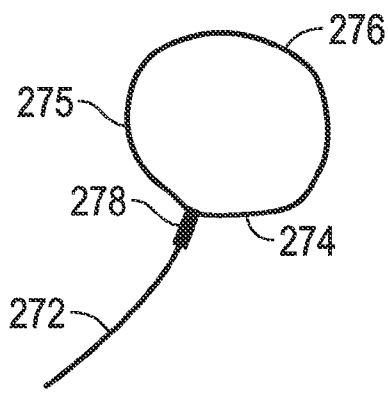
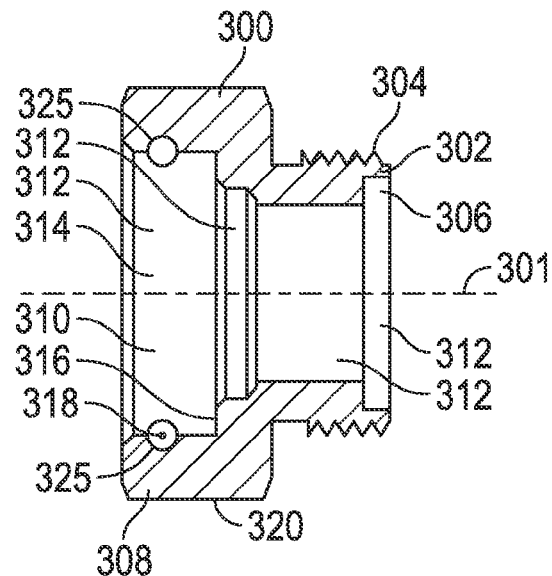
FIG. 7    FIG. 8
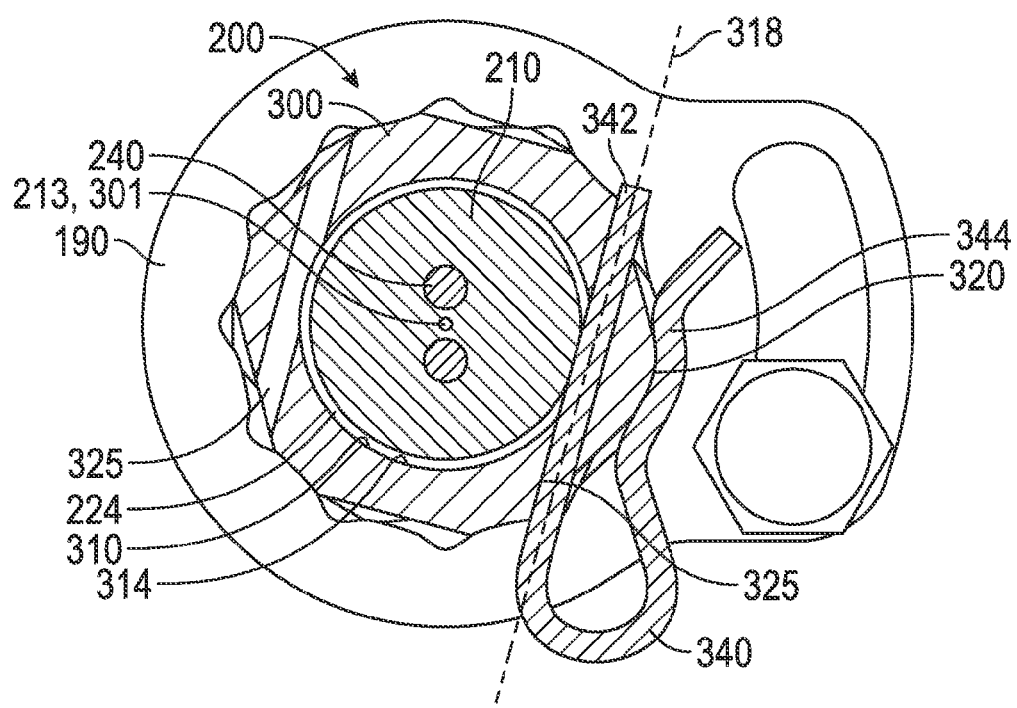
FIG. 9

TRANSDUCER CABLE ASSEMBLY AND FLOW METER EMPLOYING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Disclosure

This disclosure relates generally to transducer assemblies with cable assemblies used for instrumentation of fluid processes. More particularly, it relates to transducer and cable assemblies applicable for liquid and gas flow meters.

2. Background Information

Hydrocarbons, in both liquid and gas phases, are transported from place to place via pipelines. It is desirable to know with accuracy the amount of fluid flowing in the pipeline, particularly when the fluid is changing hands, an event referred to as "custody transfer." Even where custody transfer is not taking place, measurement accuracy is desirable, and in these situations, ultrasonic flow meters are commonly used.

An ultrasonic flow meter typically includes two or more transducers employing the piezoelectric effect, each secured inside of a dedicated port in the body of the flow meter. The body of the flow meter may also be referred to as a spool piece. The arrangement used to couple the transducers within the port also seals the fluid within the flow meter. Thus, the spool piece and the coupled transducers or transducer assemblies create a sealed housing and pressure boundary that contains the fluid that is flowing through the meter.

To measure fluid flow through the meter, a pair of transducers is positioned such that the piezoelectric elements of the transducers are adjacent the inner surface of the spool piece, and such that each transducer of the pair faces the other of the pair that is positioned on opposite sides of the fluid-carrying bore of the spool piece. The transducers transmit and receive electric signals back-and-forth across the fluid stream.

Each transducer is coupled to a cable that extends through the end connector of the transducer to the exterior of the spool piece, and to a remote location, typically an electronics enclosure mounted on or adjacent to the spool piece. The electric signals created by the piezoelectric element of the particular transducer are carried by the cable to an acquisition circuit board housed within the electronics enclosure, where the signals may be processed and subsequently used to determine the fluid flow rate through the meter.

In typical meter designs, the transducer cables are run to the electronics enclosure along the outer surface of the meter body. If unprotected, the cables and transducers would be exposed to possible damage during shipping and installation, and, upon installation, from falling debris and livestock. Consequently, it is common to employ robust and thus relatively expensive cables in an attempt to resist damage and degradation.

Protective coverings or shrouds for transducer cables may be employed. However, while protecting the transducer cables and associated end connectors from damage, the coverings limit the space available for the cable assemblies. Conventional cable assemblies that may be employed in meters providing such protection may be too large or difficult to install and service. A cable assembly for installation in a meter where the transducer and cable connector is covered or otherwise employed in a relatively small space, and one that has features that simplify the assembly of transducer assemblies or flow meters or that reduce manufacturing, assembly, or transportation costs of the same would be desirable.

BRIEF SUMMARY OF THE DISCLOSURE

These and other needs in the art are addressed in one embodiment by a transducer cable assembly for coupling a transducer to a flow meter. The cable assembly includes a plug body having a nose section with a nose end, a tail section with a tail end opposite the nose end; and a cable restraining feature disposed proximal the tail end. In addition, the cable assembly includes a cable having a first end, a second end, a signal conductor, and a pliable fixing member. A portion of the pliable fixing member is disposed in the cable restraining feature and extends at least partially around the plug body to limit the movement of the first end of the cable relative to the plug body.

In another embodiment, a termination assembly for coupling to a transducer includes a generally cylindrical plug body having a nose end, a tail end opposite the nose end, and a lock-engaging channel at a position between the tail end and the nose end. In addition, the termination assembly includes a cable having a first end, a second end, a signal conductor, and a pliable fixing member. Further, the termination assembly includes a generally tubular retainer for coupling the transducer to a meter body, the retainer having a central passage, an outer surface, and a bore intersecting the central passage. Still further, the termination assembly includes a locking member. The central passage of the retainer receives at least a portion of the plug body, including the lock-engaging channel, the lock-engaging channel being aligned with the retainer bore; furthermore, the locking member is at least partially disposed in the retainer bore and the lock-engaging channel.

In another embodiment, a flow meter includes a meter body having a transducer port and a transducer assembly disposed in the port. The transducer assembly includes a transducer housing, a transducer disposed in the housing, a retainer coupling the transducer within the transducer housing, and a cable assembly coupling the retainer and the transducer. The cable assembly includes a plug body, a cable restraining feature on the plug body, and a cable with a pliable fixing member. A portion of the pliable fixing member is disposed in the cable restraining feature and extends at least partially around the plug body to limit the movement of the cable relative to the plug body.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments, reference will now be made to the accompanying drawings in which:

FIG. 3 is a perspective view of the transducer assembly with a cable assembly of FIG. 2 in accordance with principles described herein;

FIG. 4 is an exploded view of the transducer assembly with a cable assembly of FIG. 3 in accordance with principles described herein;

FIG. 7 is a portion of the wire of the cable of the cable assembly of FIG. 5 showing the loop formed from the pliable fixing member in accordance with principles described herein.

FIG. 8 is a side view in cross-section of the retainer of the transducer assembly of FIG. 3 in accordance with principles described herein; and FIG. 9 is an end view in cross-section of the transducer assembly of FIG. 3 showing the transducer termination assembly in accordance with principles described herein.

NOTATION AND NOMENCLATURE

Figure 1:
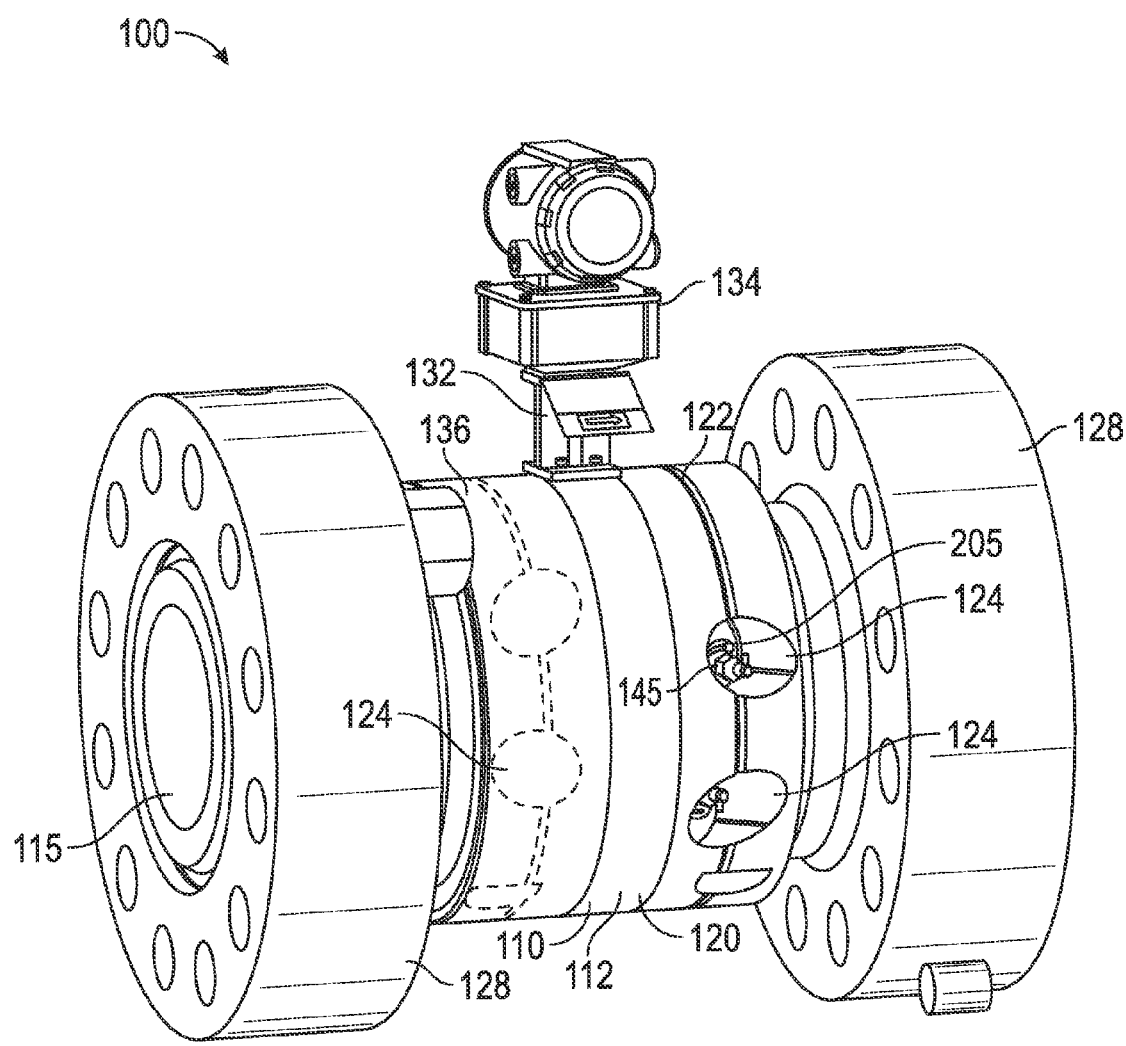
FIG. 1 is a perspective front view of an embodiment of a flow meter having transducer assemblies with cable assemblies in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness of the figure, one or more components or aspects of a component may be omitted or may not have reference numerals identifying the features or components that are identified elsewhere. In addition, within the specification, including the drawings, like or identical reference numerals may be used to identify common or similar elements.

The terms "including" and "comprising" are used herein, including in the claims, in an open-ended fashion, and thus should be interpreted to mean "including, but not limited to . . . . " Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. In addition, if the connection transfers electrical power or signals, whether analog or digital, the coupling may comprise wires or a mode of wireless electromagnetic transmission, for example, radio frequency, microwave, optical, or another mode. So too, the coupling may comprise a magnetic coupling or any other mode of transfer known in the art, or the coupling may comprise a combination of any of these modes. The recitation "based on" means "based at least in part on." Therefore, if X is based on Y, X may be based on Y and any number of other factors.

In addition, as used herein, including the claims, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Furthermore, any reference to a relative direction or relative position in the description and the claims will be made for purpose of clarification, with examples including "top," "bottom," "up," "upward," "left," "leftward," "down," "lower," "clock-wise," and the like. For example, a relative direction or a relative position of an object or feature pertains to the orientation as shown in a figure or as described. If the object or were viewed from another orientation, it may be appropriate to described the direction or position using an alternate term.

DETAILED DESCRIPTION OF THE DISCLOSED EMBODIMENTS

Referring to FIG. 1, ultrasonic flow meter 100 is an exemplary embodiment of a fluid meter in accordance with principles disclosed herein. In this embodiment, ultrasonic flow meter 100 includes a meter body or spool piece 110 suitable for placement between aligned sections of a pipeline, an electronic housing 134, a plurality of transducer assemblies 145 coupled to meter body, each having a cable assembly 205 extending to lower electronics housing 134. Cable assembly 205 is also called a cord-set. Flow meter 100 further includes a pair of covering bands 136 or shrouds covering the transducer assemblies 145. For clarity, only one covering band 136 is shown in FIG. 1.

Meter body 110 includes a pair of flanges 128 that are adapted for connection to corresponding flanges on the pipeline sections (not shown). Body 110 is shown to include a central tubular section 112 having a generally cylindrical outer surface 120 extending between flanges 128. Body 110 further includes a central flow passage 115 through which fluid flows can be measured. Typically, body 110 is forged, and then machined to its final form; however, it may be formed by any suitable manufacturing technique.

Figure 2:
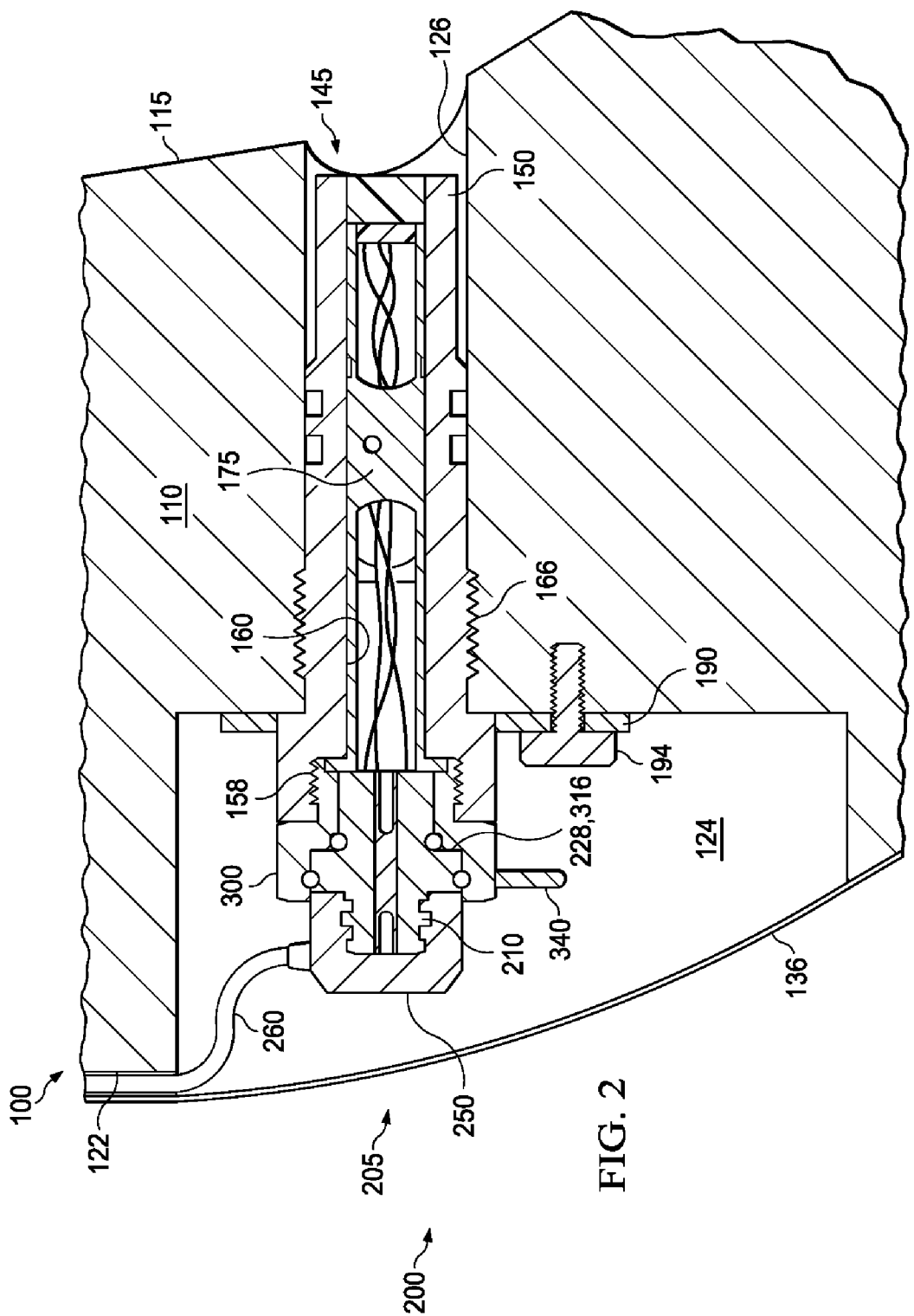
FIG. 2 is an cross-sectional view of the flow meter of FIG. 1 showing a transducer assembly with a cable assembly in accordance with principles described herein.

Referring now to FIG. 1 and FIG. 2, pockets 124 formed in the outer surface of the body 110 include threaded ports 126, each receiving a transducer assembly 145. Each port extends between central flow passage 115 and the pocket 124 in outer surface 120 of the body 110. Body 110 also includes channels 122, which extend circumferentially from pockets 124 along outer surface 120 to the top of the tubular section 112 and extend longitudinally or axially to junction block 132 mounted on outer surface 120. Electronics housing 134 is coupled to junction block 132. Channels 122, bands 136, and junction block 132 form wireways for cable assemblies 205 to pass from pockets 124 to electronics housing 134. Cable assemblies 205 are designed to fit within the relatively limited space within pockets 124 and channels 122 and, thus, may also be referred to as compact cable assemblies.

Referring still to FIG. 2, as installed in flow meter 100, transducer assembly 145 further includes a generally cylindrical ultrasonic fluid transducer 175 held within in a central chamber 160 of a transducer housing 150 by a retainer 300. The cable assembly 205 couples to fluid transducer 175 and retainer 300 by a locking member 340. In various embodiments, retainer 300 and locking member 340 are considered to be components of cable assembly 205. The combination of cable assembly 205 with retainer 300 and locking member 340 will also be called a transducer termination assembly 200.

The perspective view of FIG. 3 and the exploded view of FIG. 4 show various components of transducer assembly 145, such as transducer housing 150, fluid transducer 175, cable assembly 205, retainer 300, a rotation-resistance member 190, and locking member 340. In addition to central chamber 160 (FIG. 2), transducer housing 150 includes external threads 166, a transmission end 152, a coupling end 154 having a tool engaging outer surface 156 and a threaded inner surface 158. As shown in FIG. 2, external threads 166 engage threaded port 126 of meter body 110, and threaded inner surface 158 engages retainer 300.

Referring again to FIG. 3 and FIG. 4, fluid transducer 175 includes an active end 178 to be received adjacent transmission end 152 of housing 150 and a coupling end 180 having a plurality of electrical contacts 182 and an alignment pin 184. In this embodiment, transducer 175 has two electrical contacts 182 while other embodiments may have any practical number of contacts or alignment pins such as one, two, three, four, and the like, as may be appropriate for various types of transducers. Fluid transducer 175 includes various other components allowing it to interact sensibly with a fluid. In the disclosed embodiment, fluid transducer 175 includes piezoelectric elements and electronic components (not designated in the figures) to generate, send, and receive ultrasonic signals. A flat, rotation-resistance member 190 includes a hole having an toothed inner surface 192 configured to engage the tool engaging outer surface 156 of transducer housing 150 to prevent rotation when installed in a meter body 110. A threaded fastener 194 passing though member 190 and into meter body 110 fixedly couples it to pocket 124 (FIG. 2). In other embodiments, other means of affixing transducer housing 150 to meter body 110 may be used, such as a tack weld or a circumferential weld with or without the use of threads 166.

Figure 5:
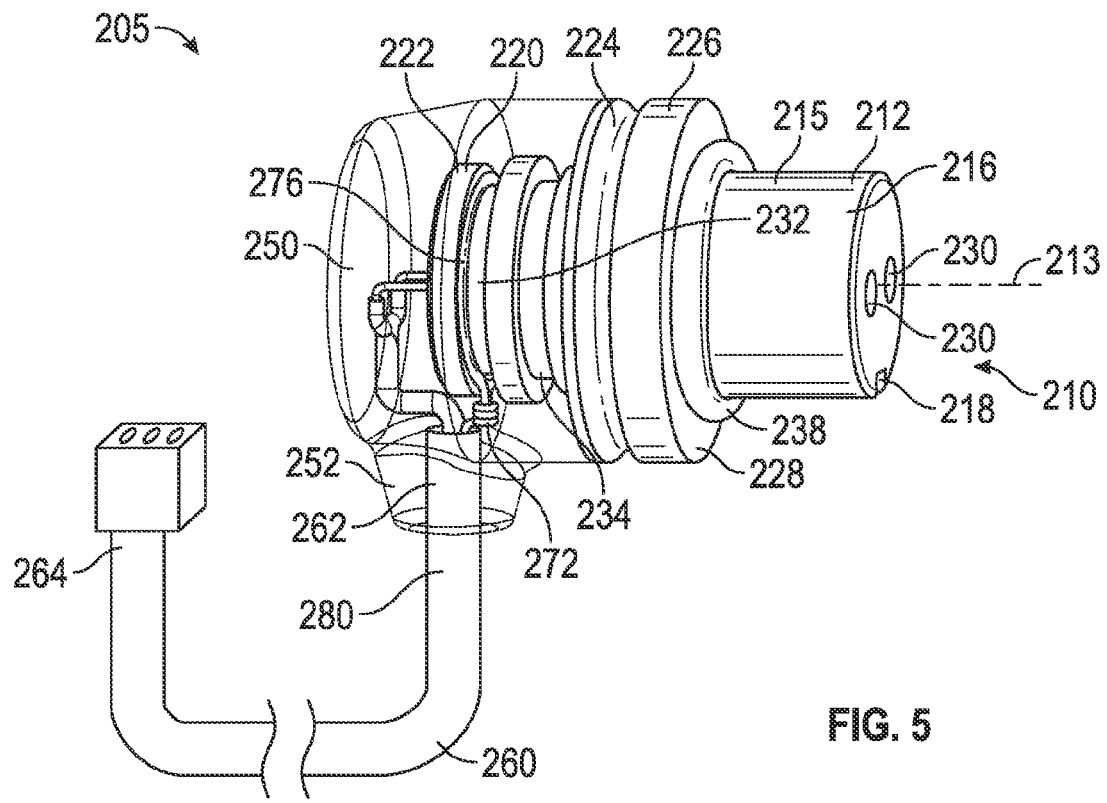
FIG. 5 is perspective view of the cable assembly of FIG. 3 showing the cover as a shadow or outline in order to reveal the pliable fixing member for strain relief in accordance with principles described herein.

Referring now to FIG. 5, cable assembly 205 includes a generally cylindrical plug 210, a plug cover 250, and a cable 260. Plug 210 includes generally cylindrical plug body 212 having a central or longitudinal axis 213, a nose section 215 with a nose end 216, and a tail section 220 with a tail end 222 opposite nose end 216. Plug 210 further includes an alignment groove 218, a lock-engaging channel 224 positioned between the tail end 222 and the nose end 216, and a cable restraining feature 232 located proximal the tail end 222. Axis 213 extends through nose end 216 and the tail end 222. Plug body 212 also includes a flange 226 positioned between nose end 216 and tail end 222 and having contact surface 228. Lock-engaging channel 224 extends circumferentially around flange 226 and plug body 212, being an open channel generally tangential to the outer surface of plug body 212 at flange 226. In the example of FIG. 5, cable restraining feature 232 is a groove or open channel that extends circumferentially around the tail section 220 of plug body 212 and extends around the axis 213. Cable restraining feature 232 will also be called cable restraining groove 232 for this embodiment.

Figure 6:
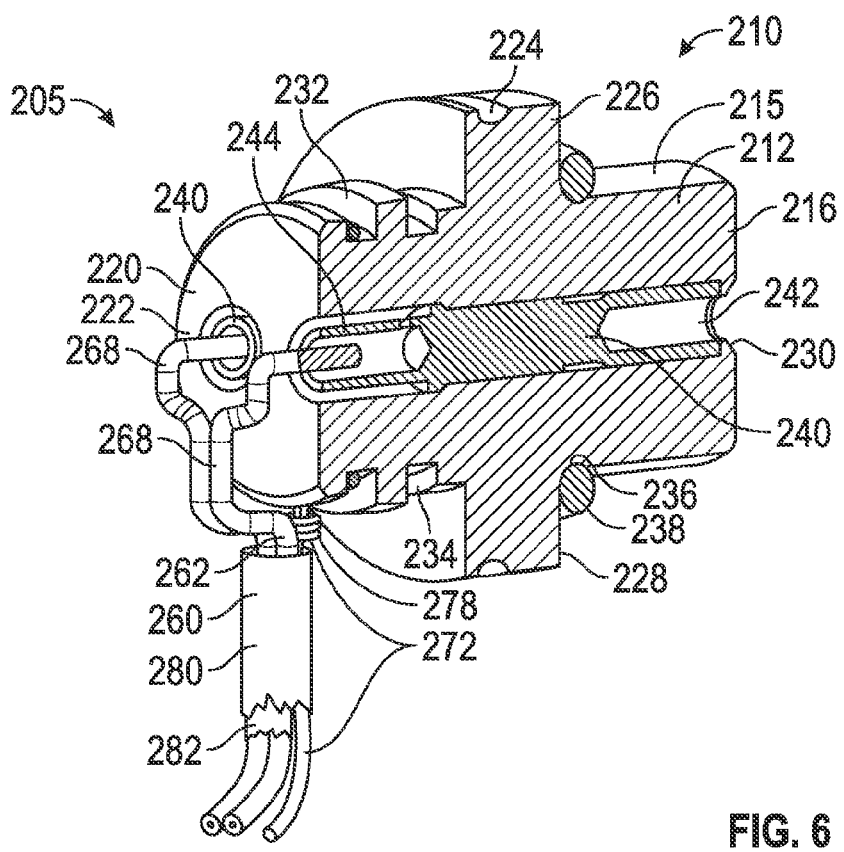
FIG. 6 is perspective view in cross-section of the cable assembly of FIG. 5 showing the electrical conductors and the pliable fixing member extending from the cable into the plug in accordance with principles described herein.

As best shown in FIG. 6, plug body 212 further includes a plurality of through-channels 230 extending from nose end 216 to tail end 222, a secondary groove 234 in tail section 220, a seal groove 236 located between nose section 212 and contact surface 228, a sealing member 238 partially disposed in seal groove 236, and an electrical contact 240 positioned in each through-channel 230. In this embodiment, electrical contact 240 is a socket contact 240 and includes a counter-bored first end 242 adjacent nose end 216 and a counter-bored second end 244 located adjacent tail end 222 for receiving mating electrical conductors, such as wires for example. Plug 210 is shown in FIG. 6 to include two through-channels 230 and two electrical contacts 240. In other embodiments, plug 210 may have any practical number of through-channels 230 and electrical contacts 240 such as one, two, three, four, and the like, up to the practical limit that could pass through the nose end 216.

Referring to both FIG. 5 and FIG. 6, cable 260 has a length that extends from a plug end 262 to a second end 264. Adjacent to plug 210, the cable's plug end 262 extends radially with respect to plug axis 213, giving cable assembly 205 a "low-profile," 90° angled profile. Cable 260 further includes a plurality of insulated signal conductors 268, a pliable fixing member 272, and insulating outer sheath 280 surrounding portions of signal conductors 268 and pliable fixing member 272. Conductors 268 and pliable fixing member 272 extend along the length of cable 260 from plug end 262 to second end 264 and are coupled together by outer sheath 280. At least in the embodiment, shown in FIG. 6, the number of signal conductors 268 is the same as the number of electrical contacts 240 in plug 210, and each signal conductor 268 couples to the second end 244 of one of the electrical contacts 240, resulting in an electrically conductive path from counter-bored first end 242 to the cable second end 264. In various embodiments, the end of each signal conductor 268 is prepared by adding a twist, adding soldier, or adding a pin to make signal conductor 268 more easily or more securely received within the counter-bored second end 244. Based on the coupling of signal conductors 268 to electrical contact 240, conductors 268 are coupled to plug body 212.

Referring still to FIG. 5 and FIG. 6, pliable fixing member 272 is an elongate, multi-stranded, electrically conductive wire. Thus, for convenience within this description, pliable fixing member 272 may also be called wire 272. A portion of wire 272 is positioned in cable restraining groove 232 and extends at least partially around the plug body 212 to limit the movement of the plug end 262 of cable 260 relative to the plug body 212, thereby providing strain relief for, i.e. limiting the strain of, signal conductors 268. More specifically, in the disclosed embodiment, at plug end 262 of cable 260, wire 272 forms a closed loop 276 around the plug body 212 within cable restraining groove 232. As shown best in FIG. 7, pliable fixing member 272, i.e. wire 272, includes end portion 274 and an intermediate portion 275 welded together at a joint 278, resulting in the formation of the closed loop 276. In other embodiments, any known method may be used for forming the joint 278, methods such as welding, soldiering, crimping, and splicing, as examples. Forming loop 276 with joint 278 by welding or soldering has the advantage of not requiring an additional piece of hardware to secure wire 272 to plug 210, providing economic advantages or process efficiency advantages.

In some embodiments, such as the example of FIG. 6, an electrically-conductive shield 282 surrounds insulated signal conductors 268 and engages wire 272 within outer sheath 280. For some of these embodiments, when properly coupled at ends 262, 264, the electrically-conductive shield 282 and wire 272 provide electromagnetic field (EMF) shielding to prevent emission of radio frequency interference (RFI) from transducer 175 and cable 260.

Referring again to FIG. 3 and FIG. 5, plug cover 250 is generally cylindrical and surrounds the tail section of plug 210 and the plug end 262 of the cable 260, including the portion of wire 272 disposed and held in the cable restraining groove 232. Cover 250 includes a tail extension 252 projecting along a length of plug end 262. In some situations, tail extension 252 provides strain relief for cable 260 in addition to the strain relief provided by wire 272. In the disclosed embodiment of FIG. 3 and FIG. 5, cover 250 is molded directly on plug 210 after cable 260 and closed loop 276 of wire 272 are attached to plug 210, and cover 250 is formed from a flexible, resilient material such as silicone. Cover 250 grips plug 210 by engagement with cable restraining groove 232 or secondary groove 234 in tail section 220. In some embodiments, plug body 212 is formed from a polyamide-imide plastic like Torlon® 4203 made by SABIC Advanced Polymers, for example. The plug body 212 of polyamide-imide plastic and the cover 250 of silicone allow the embodiment to operate within a temperature range of at least −50° to 200° C. (degrees Centigrade). Other operating ranges are achievable by selecting the appropriate materials for the various components of cable assembly 205.

Referring now to FIG. 8, retainer 300 is generally tubular and includes a central axis 301, an inner end 302, an outer end 308 disposed opposite inner end 302 along axis 301, and an axially-extending central passage 310. Retainer 300 may also be described as being generally annular. Inner end 302 includes external threads 304 and a transducer-receiving recess 306. Outer end 308 has a larger diameter than inner end 302 and includes a tool engaging outer surface 320.

Central passage 310 includes a plurality of axially-extending sections 312 having different diameters, including lock section 314 axially aligned with outer end 308. In FIG. 8, central passage 310 extends between the inner end 302 and the outer end 308, intersecting or incorporating the transducer-receiving recess 306. Lock section 314 forms a radially-extending contact surface 316 with an adjacent section 312 inside retainer 300. Two bores 325, which will also be called cross-bores 325, extend into the retainer from tool engaging outer surface 320 and intersect the lock section 314 of central passage 310 along a generally tangential path 318. In some other embodiments, a cross-bore 325 intersects lock section 314 radially closer to axis 301, flowing a secant path rather than tangent path 318. In retainer 300 of FIG. 8 cross-bores 325 pass completely through outer end 308, intersecting outer surface 320 in two places each.

FIG. 9 shows an end view of transducer assembly 145 in cross-section, splitting retainer 300, retainer cross-bores 325, locking member 340, and plug 210 perpendicular to aligned axes 213, 301. Referring to FIG. 2, FIG. 8, and FIG. 9, central passage 310 of retainer 300 receives the lock-engaging channel 224 and at least a portion of the nose section 215 of plug 210. Central passage 310 also receives at least a portion of flange 226 around which channel 224 is formed. Contact surface 228 of plug 210 is disposed adjacent, contact surface 316 of retainer 300 and may engage or not engage surface 316. In central passage 310, sealing member 238 isolates the section 312 that is proximal the inner end 302 from lock section 314 that is proximal outer end 308, inhibiting fluid transfer therebetween. The lock-engaging channel 224 is aligned with cross-bores 325. Locking member 340 is positioned within one of the retainer cross-bores 325 and lock-engaging channel 224.

As shown in FIG. 9, locking member 340 includes a shaft 342 and a latching portion 344. The shaft 342 slidingly engages retainer cross-bore 325 and the aligned lock-engaging channel 224. The latching portion 344 engages the tool engaging outer surface 320 of retainer 300 to couple, lock, or secure the shaft 342 within the retainer 300. In this manner, transducer termination assembly 200 is arranged by coupling cable assembly 205 to retainer 300 by locking member 340. In FIG. 9, locking member 340 is exemplified as a hitch-pin clip, which can be removed by needle-nose pliers without an operator reaching into pocket 124 and grasping member 340 by hand or by a tool than circumferentially extends at least part way around axes 213. Thus, the use locking member 340 may simplify the installation or maintenance of cable assembly 205, offering process efficiency advantages.

Referring again to FIG. 2 and FIG. 4, in the assembled flow meter 100, transducer housing 150 is threadingly received by port 126 of meter body 110. Transducer 175 is received within transducer housing 150, and external threads 304 of retainer 300 engage coupling end 154 of housing 150. Transducer 175 is secured by the engagement of the coupling end 180 against retainer recess 306. Plug 210 is received within central passage 310 of retainer 300, and alignment groove 218 of plug 210 slidingly engages alignment pin 184 of transducer 175. Likewise, socket contacts 240 of plug 210 engage electrical contacts 182 of transducer 175. Locking member 340 secures plug 210 within retainer 300. In this way, transducer termination assembly 200, and retainer 300 in particular, couples the fluid transducer 175 to meter body 110.

The use of transducer termination assembly 200, having cable assembly 205, retainer 300, and locking member 340, provides a quick coupling capability or, equivalently, a quick attachment/detachment capability for electrically coupling transducer 175 to signal conductors 268 and ultimately to the components in electronics housing 134. In embodiments that include locking mechanism 340, plug 210 is coupled to meter body 110 by the linear movement of locking mechanism 340. The use of locking mechanism 340 obviates the need for a captured, threaded ring that must be rotated in order to couple a plug to the meter body, as is used in some prior art designs. Engaged in channel 224, locking mechanism 340 secures plug 210 against axial movement while allowing rotational adjustment of tail extension 252 and plug end 262 (FIG. 5), respectively. In various embodiments, such as shown FIG. 9, locking mechanism 340 is not susceptible or, at least, is substantially less susceptible, to loosening due to vibration as compared to the captured, threaded ring previously mentioned.

Examples of various meter embodiments consistent with the present disclosure have been presented. In addition, various modifications can be made in in accordance with principles described herein. For example, in reference to FIG. 5, lock-engaging channel 224 was described as extending circumferentially around flange 226 and plug body 212. In some embodiments lock-engaging channel 224 is not disposed on a flange such as flange 226, or does not extend circumferentially around the entire plug body 212. As an example, in some of these embodiments channel 224 extends for only a portion of the circumference of plug body 212 or is separated in to two or more portions on plug body 212. Similarly, in some embodiments, cable restraining feature 232 extends only partially around the axis 213 or only partially around plug body 212. In some other embodiments, the cable restraining feature is an aperture, e.g. a hole, in plug body 212. An example is an aperture (not shown) that passes through tail section 220 of plug body 212, extending along a secant path without intersecting the through-channels 230. In this example, closed loop 276 of pliable fixing member 272 extends through and is therefore partially disposed in the aperture, limiting the movement of cable 260 relative to the plug body 212.

Pliable fixing member 272 was described with reference to FIG. 5 as extending along the length of cable 260 from plug end 262 to second end 264. However, in some embodiments, pliable fixing member 272 does not extend to second end 264 of cable 260. Pliable fixing member 272 was further described as an elongate, multi-stranded, electrically conductive wire. In various embodiments, pliable fixing member 272 may be a single or multiple-stranded rope or filament; a single-stranded wire, i.e. a solid wire; an elongate piece of plastic; or another suitable material.

Although cover 250 was described as flexible and resilient, in some embodiments, cover 250 is rigid, being formed in two parts and held around plug 210 by a crimped joint in cover 250 or held by a fastener such as a screw or a wrap-around style fastener, as examples.

In FIG. 8, retainer 300 includes two cross-bores 325; however, some other embodiments include one cross-bore 325 or more than two cross-bores 325, and some cross-bores 325 may intersect another cross-bore 325. Differentiated from the example of FIG. 9, in various embodiments, the latching portion 344 of locking member 340 secures the shaft 342 within the retainer 300 without grasping tool engaging outer surface 320. For example, in some embodiments, latching portion 344 is a section of shaft 342 having a larger diameter, including in some instances a tapered outer surface. The larger diameter section frictionally secures locking member 340 within cross-bore 325 of retainer 300.

Transducer termination assembly 200 and cable assembly 205 were described in relationship to ultrasonic fluid transducer 175 and ultrasonic flow meter 100. Various embodiments of termination assembly 200 and cable assembly 205 are applicable for a broad range of meters or transducers that measure, sense, or adjust fluid properties and conditions.

While exemplary embodiments have been shown and described, modifications thereof can be made by one of ordinary skill in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A cable assembly for coupling a transducer, the cable assembly comprising:
   a plug body having:
      a nose section having a nose end;
      a tail section having a tail end opposite the nose end; and
      a cable restraining feature disposed proximal the tail end; and
   a cable having a first end, a second end, a signal conductor, and a pliable fixing member;
   wherein a portion of the pliable fixing member is disposed in the cable restraining feature and extends at least partially around the plug body to limit the movement of the first end of the cable relative to the plug body.

2. The cable assembly of claim 1 wherein the pliable fixing member forms a closed loop around the plug body; and wherein a first portion of the pliable fixing member is coupled to an intermediate portion of the pliable fixing member.

3. The cable assembly of claim 2 wherein a welded joint couples the first portion of the pliable fixing member to the intermediate portion of the pliable fixing member.

4. The cable assembly of claim 1 wherein the cable restraining feature extends at least partially around the plug body.

5. The cable assembly of claim 4 wherein the cable restraining feature is a groove that extends circumferentially around the plug body tail section.

6. The cable assembly of claim 1 further comprising a cover surrounding the first end of the cable, including the portion of the pliable fixing member disposed in the cable restraining feature.

7. The cable assembly of claim 1 further comprises a signal conductor coupled to the plug body; wherein the signal conductor and the pliable fixing member extend along a cable length generally from the first end to the second end and are coupled together for a portion of the cable length.

8. The cable assembly of claim 1 further comprising
   an annular retainer for coupling the transducer to a meter body, the retainer having a first end, a second end, a central passage extending between the first end and the second end, and a bore extending into the retainer and intersecting the central passage; and
   a locking member;
   wherein the plug body further comprises a lock-engaging channel positioned between the tail end and the nose end;
   wherein the central passage of the retainer receives the lock-engaging channel and at least a portion of the nose section of the plug body, the lock-engaging channel being aligned with the retainer bore; and
   wherein the locking member is at least partially disposed in the retainer bore and the lock-engaging channel.

9. The cable assembly of claim 8 wherein the retainer bore extends along a path generally tangent to the central passage;
   wherein the plug body is generally cylindrical, having at least one diameter; and
   wherein the lock-engaging channel is an open channel generally tangential to the plug body.

10. The cable assembly of claim 8 wherein the plug body further comprises a flange disposed between the tail end and the nose end; and
    wherein the lock-engaging channel extends circumferentially around the outer surface of the flange; and
    wherein the central passage of the retainer includes a plurality of axially-extending sections of different diameters, and the central passage receives at least a portion of the flange as well as at least a portion of nose section.

11. A termination assembly for coupling to a transducer, the termination assembly comprising:
    a generally cylindrical plug body having a nose end, a tail end opposite the nose end, and a lock-engaging channel at a position between the tail end and the nose end;
    a cable having a first end, a second end, a signal conductor, and a pliable fixing member;
    a generally tubular retainer for coupling the transducer to a meter body, the retainer having a central passage, an outer surface, and a bore intersecting the central passage; and
    a locking member;
    wherein the central passage of the retainer receives at least a portion of the plug body, including the lock-engaging channel, the lock-engaging channel being aligned with the retainer bore;
    wherein the locking member is at least partially disposed in the retainer bore and the lock-engaging channel.

12. The termination assembly of claim 11 wherein the locking member comprises a shaft and a latching portion;
    wherein the shaft is slidingly engaged in the retainer bore and in the lock-engaging channel; and
    wherein the latching portion is configured to couple the shaft to the retainer.

13. The termination assembly of claim 11 further comprising a cover surrounding at least a portion of the plug body and at least a portion of the cable.

14. The termination assembly of claim 11 wherein retainer bore intersects the outer surface and extends along a path generally tangent to a section of the central passage; and
   wherein the lock-engaging channel is an open channel, extending tangentially along the generally cylindrical plug body.

15. The termination assembly of claim 14 wherein the plug body further comprises a flange disposed between the tail end and the nose end; and
   wherein the lock-engaging channel extends circumferentially around the outer surface of the flange; and
   wherein the central passage of the retainer includes a plurality of axially-extending sections of different diameters, and the central passage receives at least a portion of the flange.

16. The termination assembly of claim 11 wherein the plug body further comprises a cable restraining groove disposed proximal the tail end;
   wherein the signal conductor and the pliable fixing member extend along a cable length generally from the first end to the second end;
   wherein the signal conductor and the pliable fixing member are coupled together for a portion of the cable length; and
   wherein a portion of the pliable fixing member is disposed in the cable restraining groove to limit the movement of the first end of the cable relative to the plug body.

17. The termination assembly of claim 16 wherein the pliable fixing member forms a closed loop around the plug body; wherein a first portion of the pliable fixing member is coupled to an intermediate portion of the pliable fixing member.

18. The termination assembly of claim 16 wherein the cable restraining groove extends circumferentially around the plug body.

19. The termination assembly of claim 11 further comprising an electrical contact extending between the nose end and the tail end of the plug body;
   wherein the signal conductor of the cable couples electrically to the electrical contact.

20. A flow meter, comprising:
   a meter body having a transducer port; and
   a transducer assembly disposed in the port and comprising
      a transducer housing;
      a transducer disposed in the housing;
      a retainer coupling the transducer within the transducer housing; and
      a cable assembly coupling the retainer and the transducer, the cable assembly comprising a plug body, a cable restraining feature on the plug body, and a cable that comprises a pliable fixing member;
   wherein a portion of the pliable fixing member is disposed in the cable restraining feature and extends at least partially around the plug body to limit the movement of the cable relative to the plug body.

21. The flow meter of claim 20 wherein the cable restraining feature is a groove that extends at least partially around the plug body; and
   wherein the pliable fixing member forms a closed loop around the plug body; wherein a first portion of the pliable fixing member is coupled to an intermediate portion of the pliable fixing member.

22. The flow meter of claim 20 wherein the retainer comprises a central passage and a bore extending into the retainer and intersecting the central passage; and the cable assembly further comprises a locking member;
   wherein the plug body further comprises a lock-engaging channel;
   wherein the central passage of the retainer receives the lock-engaging channel and at least a portion of the plug body, the lock-engaging channel being aligned with the retainer bore;
   wherein the locking member is at least partially disposed in the retainer bore and the lock-engaging channel.

* * * * *